Stricker & Lefebre.
Dressing Staves.
No. 86,108. Patented Feb. 2, 1869.
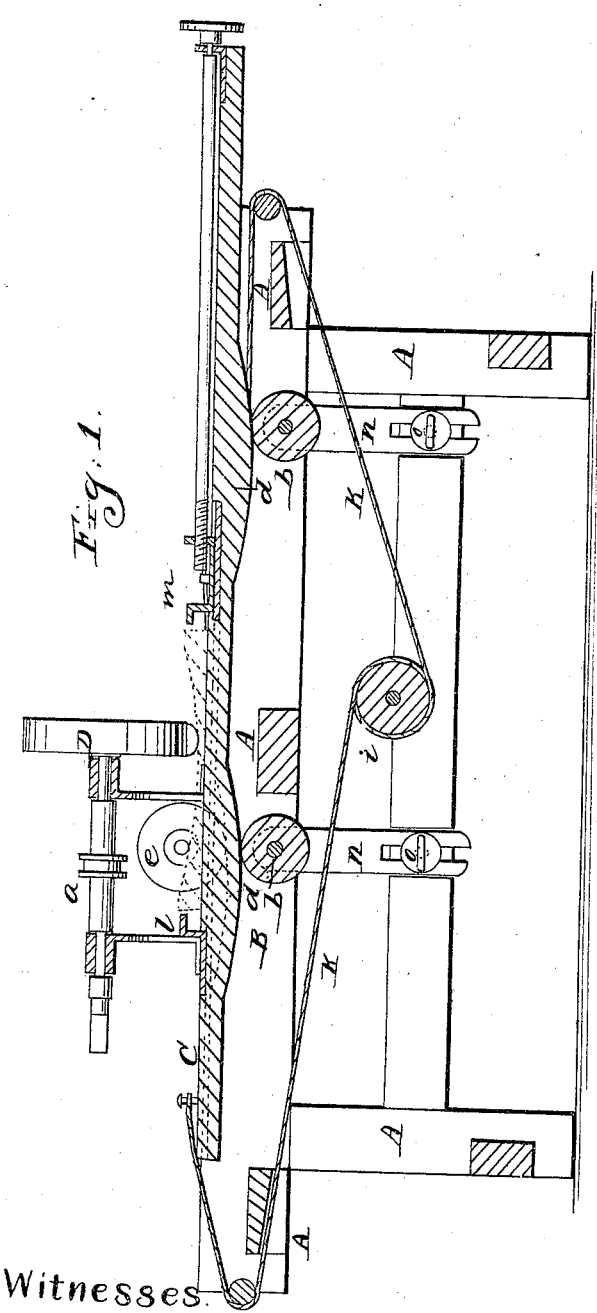
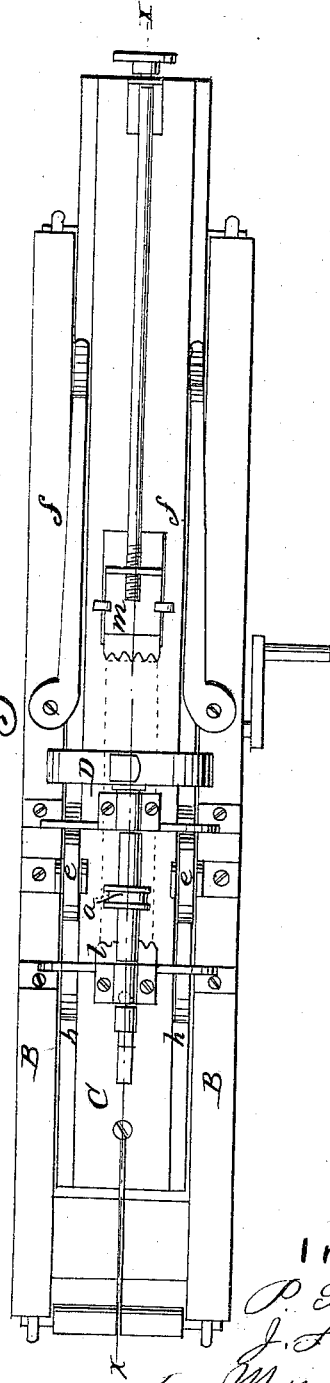
Witnesses
Wm A Morgan
G. E. Colton
Inventor
P. Stricker
J. Lefebre
per Munn & Co
Attorneys

United States Patent Office.

PETER STRICKER AND JAMES LEFEBER, OF CAMBRIDGE CITY, INDIANA.

Letters Patent No. 86,468, dated February 2, 1869.

IMPROVEMENT IN STAVE-DRESSING MACHINE.

The Schedule referred to in these Letters Patent and making part of the same.

*To all whom it may concern:*

Be it known that we, PETER STRICKER and JAMES LEFEBER, of Cambridge City, in the county of Wayne, and State of Indiana, have invented a new and useful Improvement in Machines for Dressing Barrel-Staves; and we do hereby declare that the following is a full, clear, and exact description thereof, which will enable others skilled in the art to make and use the same, reference being had to the accompanying drawings, forming part of this specification, in which—

Figure 1 is a transverse section of our machine through $x\ x$ of Figure 2, which latter is a top view of the machine.

Similar letters of reference indicate like parts.

This invention relates to improvements in machines for cutting beer-barrel staves, which are thinner at their centre than at their ends; and It consists in the arrangement of the rotary cutter transversely of the rising and falling carriage, with its arbor or shaft parallel to the longitudinal movement of the latter, for the purpose of hollowing out a barrel-stave longitudinally and transversely, with its centre thinner than its ends.

In the drawings—

A A A A, B B is the general frame of the machine.

Between the horizontal top-pieces B B, the carriage C is guided in its to-and-fro motion, under the cutter-wheel D, the revolving plane of which is crosswise of the carriage, as shown. The bearings of the shaft of the said wheel are affixed to the pieces B B.

$a$ is the pulley for driving the cutter-wheel.

$b\ b$ are rolls, on which the carriage rests, and have bearings in the top pieces B B, or other suitable parts of the frame.

$d\ d$ are the curved parts of the carriage, which cause the latter to rise and fall, as the said curved parts pass over the rolls $b\ b$.

The carriage is held down upon the rolls by means of counter-wheels $e\ e$, or springs $f\ f$, or a weight or weights suspended from or affixed to the under side of the carriage, may be employed, or the curved parts $d\ d$ may consist of cast-iron or other metal, in order to insure by its weight the proper contact of the carriage with the rolls $b\ b$.

When the wheels $e\ e$ are used, their tracks on the carriage should be concave, or curved downward, to correspond to the curve of the parts $d\ d$, so that the vertical motion of the carriage will be possible.

The springs $f\ f$ are affixed to the top pieces B B, so that their free ends will bear upon the carriage, as shown in fig. 2.

The wood being dressed, is shown in red color, being held by the fixed dog $l$ and the adjustable dog $m$.

The rolls $b\ b$ have bearings in the slotted plates $n$, which permit the adjustment of the rolls to and desired thickness of wood, a clamp-screw, $a$, serving to fasten each plate firmly to the frame.

We are aware of the patent granted to Dixon Lewers, December 24, 1867, in which the cutter is arranged to operate transversely of an ordinary stave, and also of the patent granted to W. A. Ellis, July 31, 1866, in which a table is arranged to move in curved guides for the purpose of hollowing out staves, but we claim nothing shown in these patents, as they do not relate to our improvements.

Having thus described our invention,

We claim as new, and desire to secure by Letters Patent—

The arrangement, herein described, of the transverse cutter D, and the rising and following carriage C, for the purpose specified.

PETER STRICKER.
JAMES LEFEBER.

Witnesses as to PETER STRICKER:
  GEORGE W. SHULTS,
  NATHAN RAYMOND.

Witnesses as to JAMES LEFEBER:
  G. W. SHULTS,
  HENRY SMITH.